Dec. 31, 1963    R. M. THOEN ET AL    3,115,739
FENCE ROW MOWER ATTACHMENT FOR FARM TRACTORS
Filed Jan. 15, 1963    2 Sheets-Sheet 1

INVENTORS
ROY M. THOEN
LEANDER KASSUELKE
BY
Carlsen Carlsen + Sturm
ATTORNEYS

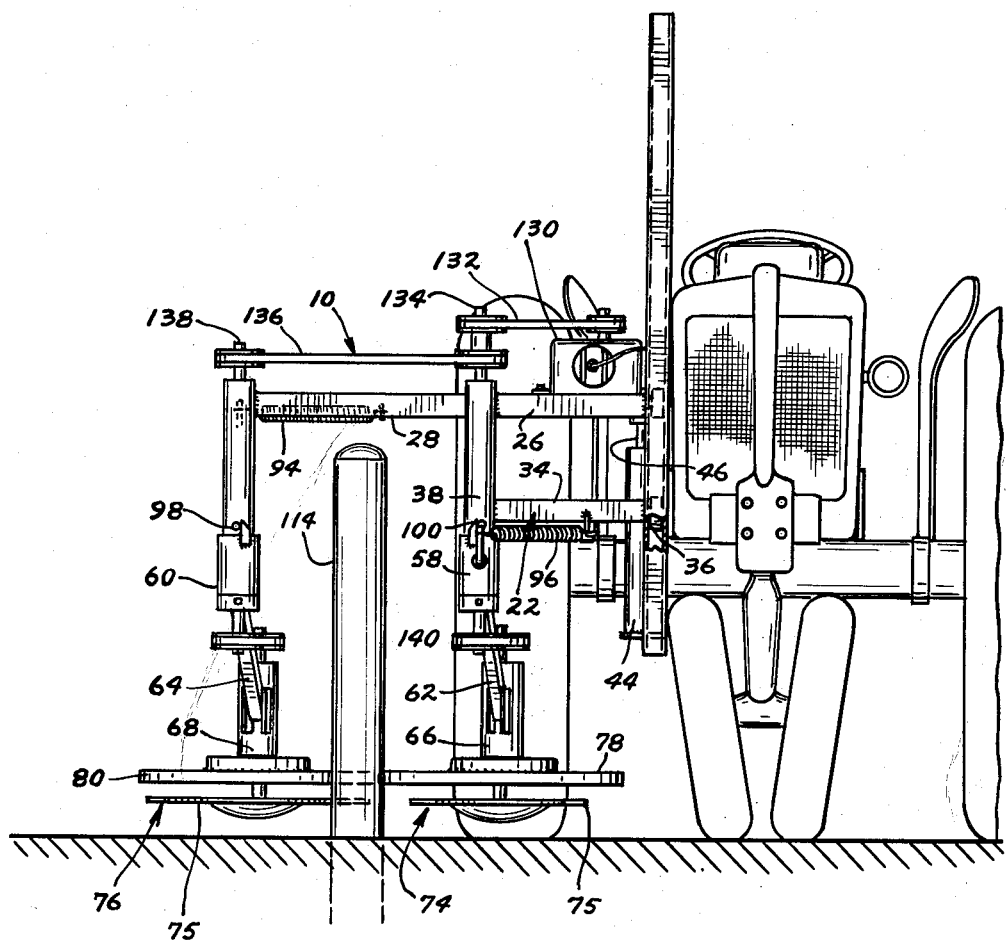

United States Patent Office 3,115,739
Patented Dec. 31, 1963

3,115,739
FENCE ROW MOWER ATTACHMENT FOR
FARM TRACTORS
Roy M. Theen, 1313 Marsh St., and Leander Kassuelke,
605 Lyndale, both of Mankato, Minn.
Filed Jan. 15, 1963, Ser. No. 251,677
2 Claims. (Cl. 56—6)

The present invention relates to mowing machines and more particularly to a mower adapted to be used in cutting substantially all of the vegetation below and upon both sides of a highway guard rail or fence.

The present application is a continuation-in-part of our copending application Serial No. 132,275, filed August 14, 1961, now abandoned, for Tractor Mounted Power Specially Designed for Highway and County Roadways.

A variety of mowing machines have been previously proposed for cutting grass and other kinds of vegetation. Most of these prior devices have been utterly unsuitable for cutting grass around a fence because it is impossible to steer the vehicle upon which the mower is mounted with sufficient accuracy to cut grass located under the fence while at the same time avoiding contact with fence posts. Moreover, these prior devices can be used to cut the grass on only one side of the fence.

In order to overcome these shortcomings in the prior art, proposals have been made for mounting a mower cutting head so that it will swing toward the fence when in operation. A wheel is also mounted upon the cutting head to keep the blade from striking the fence posts.

This type of device also suffers from certain shortcomings, the most important of which is that the swath cut by the mower is of necessity positioned on one side of the fence only. Furthermore, none of the grass on one side of each fence post can be cut at all. As a result, it is necessary to run the mower first along one side of the fence and then along the other side at double the operating cost of running the mower along only one side of the fence.

In view of these and other shortcomings of the prior art it is one object of the invention to provide an improved mower for cutting grass around fences which is rugged in construction and will reliably cut in a single pass the vegetation located upon both sides of a fence as well as that located below the fence.

It is another object of the present invention to provide an improved mower for clearing fences which will not skip areas when cutting between fence posts.

Still another object of the present invention is the provision of an improved mower for fences including a means for quickly and easily placing the mower blades in position for operation adjacent to a fence and for removing the blades from their operating position adjacent the fence when the work has been completed.

These and other more detailed and specific objects will be disclosed in the course of the following specification, reference being had to the accompanying drawings, in which:

FIG. 3 is an enlarged front elevational view of the apparatus of FIGS. 1 and 2.

Figure 1:
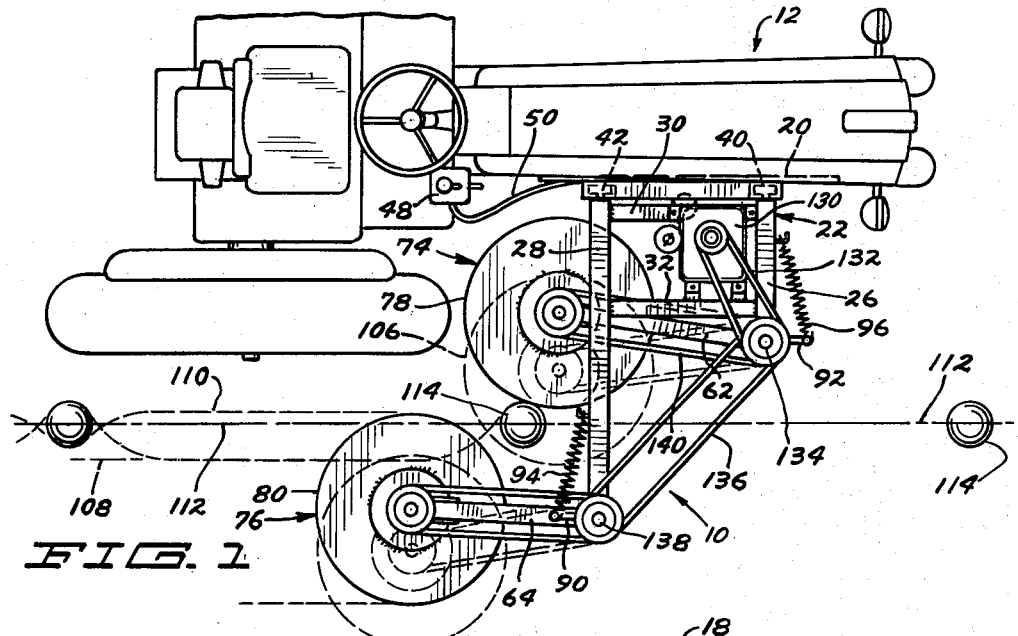
FIG. 1 is a plan view of a mower according to the present invention as seen when supported upon a farm tractor.

Referring now specifically to the drawings which illustrate a preferred form of the present invention, there is shown a mower 10 supported upon a motor vehicle such as a farm tractor 12 of any well known construction. The mower 10 includes a supporting framework 11 comprising vertically disposed guide rails 14 and 16 which are rigidly connected at their upper and lower ends by cross members 18 and 20, respectively. The framework 11 is suitably secured to the tractor 12 by bolts or other fasteners (not shown).

Mounted upon the framework 11 for vertical sliding movement is a carriage 22 composed of front and rear structural members 26 and 28 connected by cross members 30 and 32. Below member 26 is provided a member 34 on one end of which is mounted a roller 36 (FIG. 3). The other end of member 34 is connected to a vertically disposed tube 38. Similar rollers 40 and 42 are mounted upon one end of each of the members 26 and 28. Each of the rollers 36, 40 and 42 are mounted for movement upon the guide rails 14 and 16, as best seen in FIGS. 1 and 3. In this way, the carriage 22 is free to be moved along a vertically disposed path upon the framework 11.

Mounted upon the framework 11 below the carriage 22 is a motive power source such as hydraulic cylinder 44. The cylinder 44 includes a connecting rod 46 the upper end of which is secured to cross member 32 of carriage 22. During operation, hydraulic fluid is supplied from a conventional source of fluid pressure (not shown) through a control valve 48 and line 50 to the cylinder 44. Thus, to raise the carriage 22, the valve 48 is opened allowing fluid under pressure to pass into cylinder 44 and thereby force the rod 46 upwardly.

Rigidly secured to the outer end of the member 28 is a vertically disposed tube 52. As best seen in FIGS. 1 and 3, the member 28 extends laterally a substantial distance beyond the outward end of member 26, thus positioning the tube 52 laterally of tube 38 as well as rearwardly thereof.

Rotatably mounted upon the lower end of tubes 38 and 52 are sleeves 58 and 60. Extending rearwardly from sleeves 58 and 60 respectively are mower support arms 62 and 64. Suitable journals 66 and 68 are mounted in a vertical position at the rearward end of each of arms 62 and 64 respectively. Within these journals are rotatably mounted mower shafts 70 and 72 respectively. Rigidly affixed to the lower ends of the shafts 70 and 72 respectively are mower heads 74 and 76. Each mower head includes a horizontally disposed mower blade 75. A large cup-shaped guide member 75' is affixed to each blade 75 to prevent the latter from striking the ground.

Mounted for rotation upon the lower end of each of journals 66 and 68 are guide means such as wheels 78 and 80 respectively. The diameter of the wheels 78 and 80 is slightly larger than that of the heads 74 and 76 so as to prevent the latter from hitting obstructions or from hitting each other during use. The wheels 78 and 80 act as idler wheels and thus rotate independently of the shafts 70 and 72. The periphery of each of the wheels 78 and 80 is preferably formed from a resilient material such as rubber to prevent damage to fence posts and the like.

Rigidly mounted upon the sleeve 60 is a rearwardly extending bracket 90. A similar bracket 92 extends forwardly from the sleeve 58. Connected between the bracket 90 and member 28 is a spring 94 for yieldably biasing the mower head 76 toward the left in FIG. 1. A similar spring 96 is connected between bracket 92 and member 26 for biasing the arm 62 and head 74 in the opposite direction. In this way, the heads 74 and 76 are yieldably biased toward one another about the center of tubes 58 and 60 respectively.

Figure 2:
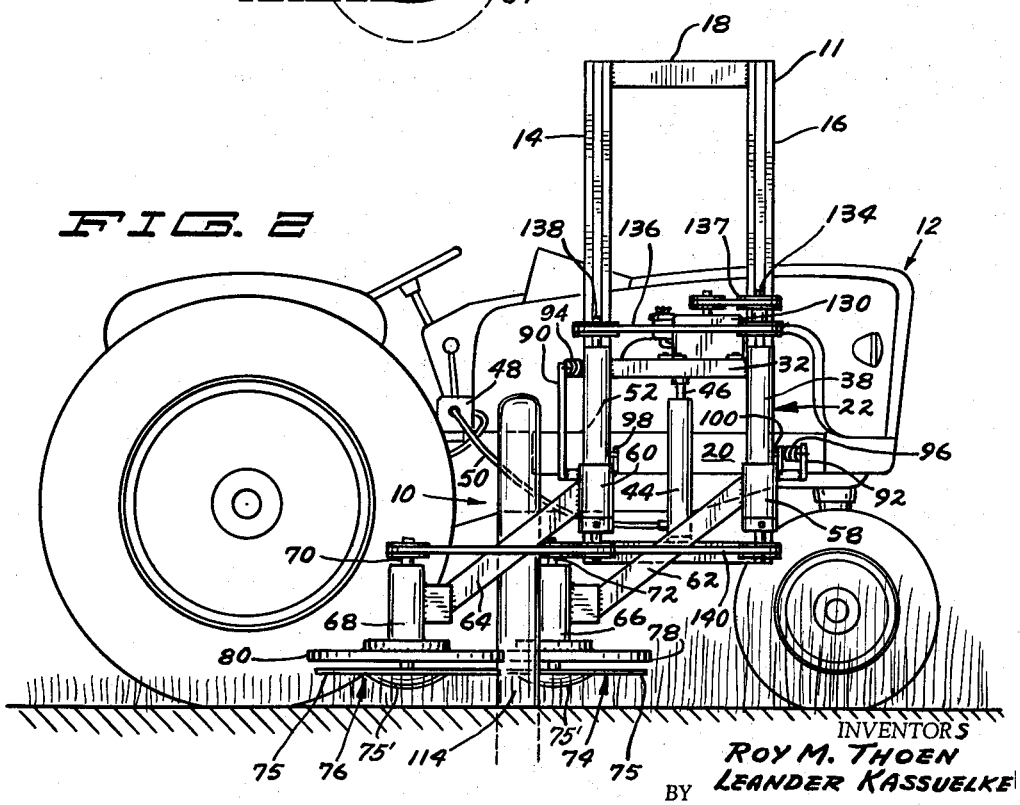
FIG. 2 is a side elevational view of the apparatus shown in FIG. 1.

As best seen in FIGS. 2 and 3, a stop 98 is provided on the tube 52 to limit the inward movement of arm 64 about tube 52. A similar stop 100 is provided on tube 38 for limiting the outward movement of arm 62 about the center of tube 38. The stops 98 and 100 thus serve as a means for establishing the lateral position of mower heads 74 and 76 with respect to the carriage 22.

As shown in FIG. 1, the stops 98 and 100 allow the mower heads to overlap in a horizontal plane when each is moved toward the other as far as possible. Under these conditions, the cutting head 74 will be located in the dotted line position designated 106 while the head 76 is in the solid line position of FIG. 1. In these undeflected positions the mower head 74 will cut a swath ending at dotted line 108 while head 76 will cut as far as dotted line 110. It is thus clear that heads 74 and 76 cooperate to assure that none of the hay below the fence will remain uncut.

When the mower is being operated in the vicinity of a fence 112 or the like, the heads 74 and 76 are placed on opposite sides thereof, as shown in FIG. 1, and the tractor 12 is driven along a straight path parallel to the fence. When the mower is raised or lowered with respect to the fence, the heads 74 and 76 are separated manually so as to clear the fence cables. As the fence posts 114 pass rearwardly between heads 74 and 76, the wheels 78 and 80 will contact the posts causing the mower heads to be deflected to the solid line position in the case of head 74 and to the dotted line position of head 76 as shown in FIG. 1. The mower blades will in this way be prevented from hitting the posts 114 while the mower heads at the same time cooperate to cut all of the hay beneath the fence.

As heads 74 and 76 strike the posts 114, the edge of the blades will be deflected along lines 116 and 118 respectively. It is thus possible by means of our invention to cut very cleanly around each post. Moreover, since grass on each side of the fence is cut as well as that below the fence, the entire fence is cleared in a single pass.

While the mower heads can be powered in various ways, they may conveniently be driven by an air cooled engine 130 affixed upon the upper side of the carriage 22. To this end, an endless belt 132 is connected between the motor 130 and a vertically disposed shaft 134 mounted for rotation within tube 52. A second belt 136 is connected between shaft 134 and a shaft 138 mounted for rotation within tube 52. A third belt 140 is connected between shaft 134 and shaft 72 and a fourth belt 142 is connected between shaft 138 and shaft 70. In this way, the blades 75 can be rotated at high speed.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A fence mower for use with a supporting vehicle, said mower comprising in combination a supporting member adapted to be secured to one side of said vehicle, first and second pivot members operatively connected to said member and positioned laterally of said vehicle, a support arm rotatably supported on each of the pivot members and extending rearwardly therefrom, spring means operatively connected between each said arm and said supporting member for yieldably biasing the rearward end of each arm to move toward one another, stop means operatively connected between each said arm and each said pivot member for limiting the movement of the rearward end of each such arm toward the other such arm, a mower head including a mower blade mounted upon the rearward end of each arm, a motive power means operatively connected to each mowing head for driving said mowing head, and a guard means on said mower for deflecting said mower heads around objects supported upon the ground.

2. The apparatus according to claim 1 wherein said pivot members are mounted upon said supporting member for movement along a vertical path and a drive means is operatively connected between said pivot members and said supporting member for raising and lowering said pivot members upon said supporting member.

References Cited in the file of this patent

UNITED STATES PATENTS

| | | |
|---|---|---|
| 2,791,081 | Allen et al. | May 7, 1957 |
| 2,851,842 | Harp | Sept. 16, 1958 |
| 3,045,413 | Shaffer | July 24, 1962 |